United States Patent
Yoon et al.

(10) Patent No.: US 10,036,892 B1
(45) Date of Patent: Jul. 31, 2018

(54) ADHESIVE IMMERSION OF AN OPTICAL ASSEMBLY

(71) Applicant: OCULUS VR, LLC, Menlo Park, CA (US)

(72) Inventors: Youngshik Yoon, Cupertino, CA (US); Richard Han Soo Cho, Sunnyvale, CA (US)

(73) Assignee: OCULUS VR, LLC, Menlo Park, CA (US)

( * ) Notice: Subject to any disclaimer, the term of this patent is extended or adjusted under 35 U.S.C. 154(b) by 0 days.

(21) Appl. No.: 15/492,895

(22) Filed: Apr. 20, 2017

(51) Int. Cl.
| | |
|---|---|
| *G02B 27/62* | (2006.01) |
| *G02B 7/02* | (2006.01) |
| *H04N 5/225* | (2006.01) |
| *B29D 11/00* | (2006.01) |
| *G01B 11/27* | (2006.01) |
| *G02B 27/01* | (2006.01) |

(52) U.S. Cl.
CPC .... *G02B 27/0172* (2013.01); *B29D 11/00403* (2013.01); *B29D 11/00442* (2013.01); *G01B 11/27* (2013.01); *G02B 7/025* (2013.01); *G02B 27/62* (2013.01); *H04N 5/2253* (2013.01); *H04N 5/2254* (2013.01); *B29K 2995/0026* (2013.01); *G02B 2027/0138* (2013.01); *G02B 2027/0178* (2013.01)

(58) Field of Classification Search
None
See application file for complete search history.

(56) References Cited

U.S. PATENT DOCUMENTS

| | | | |
|---|---|---|---|
| 2003/0002166 A1* | 1/2003 | Wilmington | G02B 27/01 359/630 |
| 2006/0119805 A1* | 6/2006 | Wittenberg | G02B 7/025 353/100 |
| 2007/0091473 A1* | 4/2007 | Shimizu | B29D 11/0073 359/796 |
| 2011/0222161 A1* | 9/2011 | Yoneyama | G02B 3/0056 359/619 |
| 2011/0299180 A1* | 12/2011 | Yen | G02B 7/022 359/819 |
| 2014/0184809 A1* | 7/2014 | Luan | H01L 27/14618 348/164 |
| 2017/0163856 A1* | 6/2017 | Wang | G02B 7/003 |
| 2017/0289420 A1* | 10/2017 | Reiche | H04N 5/2257 |

* cited by examiner

*Primary Examiner* — W B Perkey
(74) *Attorney, Agent, or Firm* — Morgan, Lewis & Bockius LLP

(57) ABSTRACT

A method of making an optical assembly includes obtaining a first optical element having a first optical surface and a second optical surface that is opposite to the first optical surface, and a second optical element having a third optical surface and a fourth optical surface that is opposite to the third optical surface. The second optical element is distinct and separate from the first optical element. The method also includes obtaining an enclosure configured to enclose the first optical element and the second optical element. The method further includes providing one or more fillers in the enclosure so that the one or more fillers are in contact with the second optical surface and the third optical surface, thereby making the optical assembly. Also disclosed are an optical assembly made by the method and an optical imaging device including the optical assembly.

19 Claims, 9 Drawing Sheets

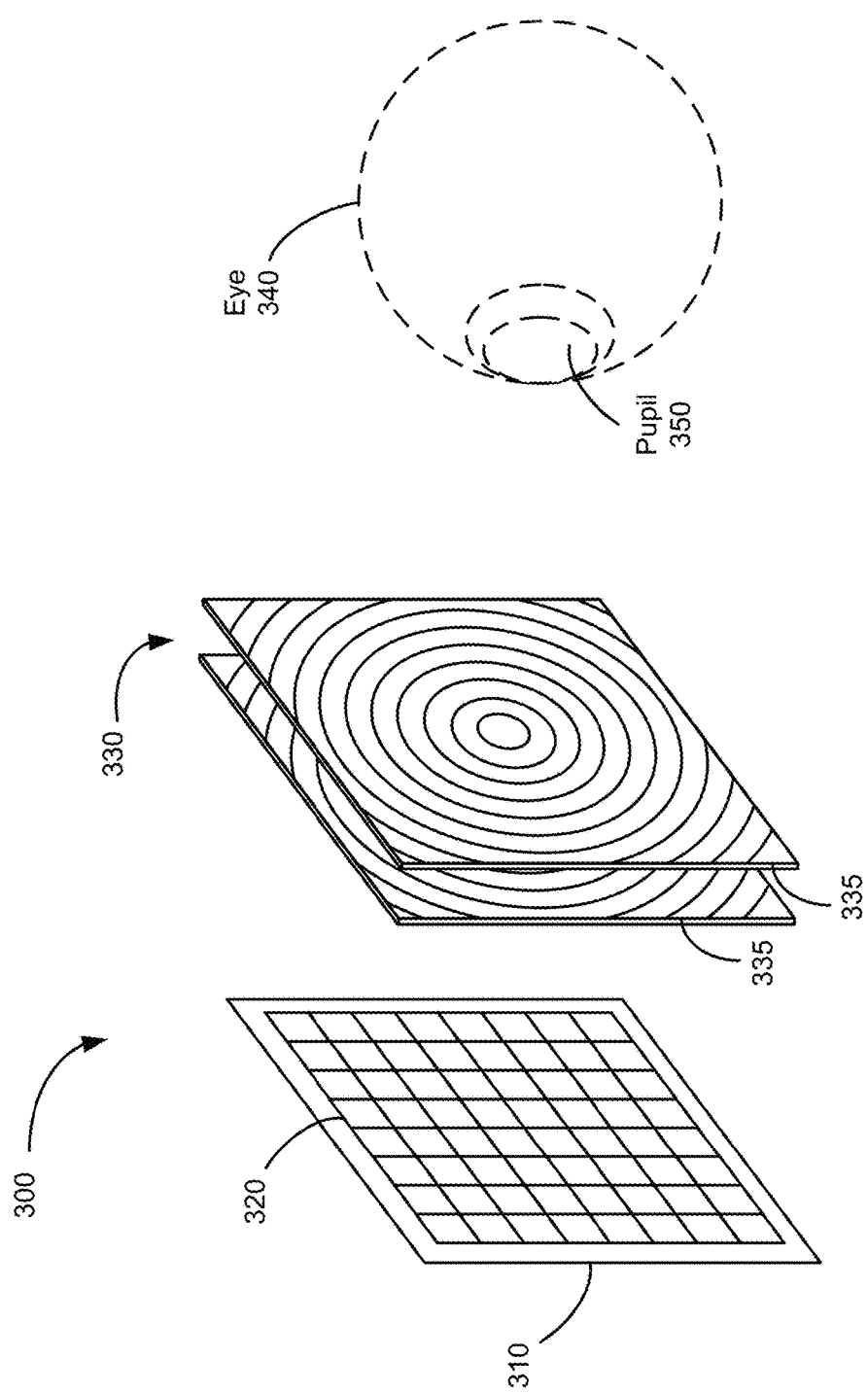

ADHESIVE IMMERSION OF AN OPTICAL ASSEMBLY

TECHNICAL FIELD

This relates generally to optical assemblies, and more specifically to lens assemblies used in head-mounted display device systems.

BACKGROUND

Head-mounted display devices (also called herein head-mounted displays) are gaining popularity as means for providing visual information to a user.

Head-mounted display devices and systems include one or more optical sensors used for detection of user's movements. Such optical sensors have a large field of view to monitor the movement of a user over a large area. Such optical sensors require optical elements with good mechanical performance and stability.

SUMMARY

Accordingly, there is a need for optical elements with improved mechanical performance and stability for head-mounted display devices and systems. The disclosed optical assemblies include two or more optical elements with an enclosure, and one or more fillers in contact with two or more optical elements and the enclosure. The disclosed optical assemblies provide for improved support against mechanical shocks, and increased tolerance for temperature fluctuations.

In accordance with some embodiments, a method of making an optical assembly includes obtaining a first optical element having a first optical surface and a second optical surface that is opposite to the first optical surface, and a second optical element having a third optical surface and a fourth optical surface that is opposite to the third optical surface. The second optical element is distinct and separate from the first optical element. The method also includes obtaining an enclosure configured to enclose the first optical element and the second optical element. The method further includes providing one or more fillers in the enclosure so that the one or more fillers are in contact with the second optical surface and the third optical surface, thereby making the optical assembly.

In some embodiments, an optical assembly is made by any method described herein.

In accordance with some embodiments, an optical imaging device includes an optical assembly described herein, and one or more optical sensors coupled with the optical assembly so that light transmitted through the optical assembly is received by the one or more optical sensors.

In accordance with some embodiments, an optical assembly includes a first optical element having a first optical surface and a second optical surface that is opposite to the first optical surface, and a second optical element having a third optical surface and a fourth optical surface that is opposite to the third optical surface. The second optical element is distinct and separate from the first optical element. The optical assembly also includes one or more fillers located between the first optical element and the second optical element. The one or more fillers are in contact with the second optical surface and the third optical surface.

Thus, the disclosed embodiments provide optical assemblies that provide improved mechanical performance and stability, and methods of making such optical assemblies.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

Figure 1:
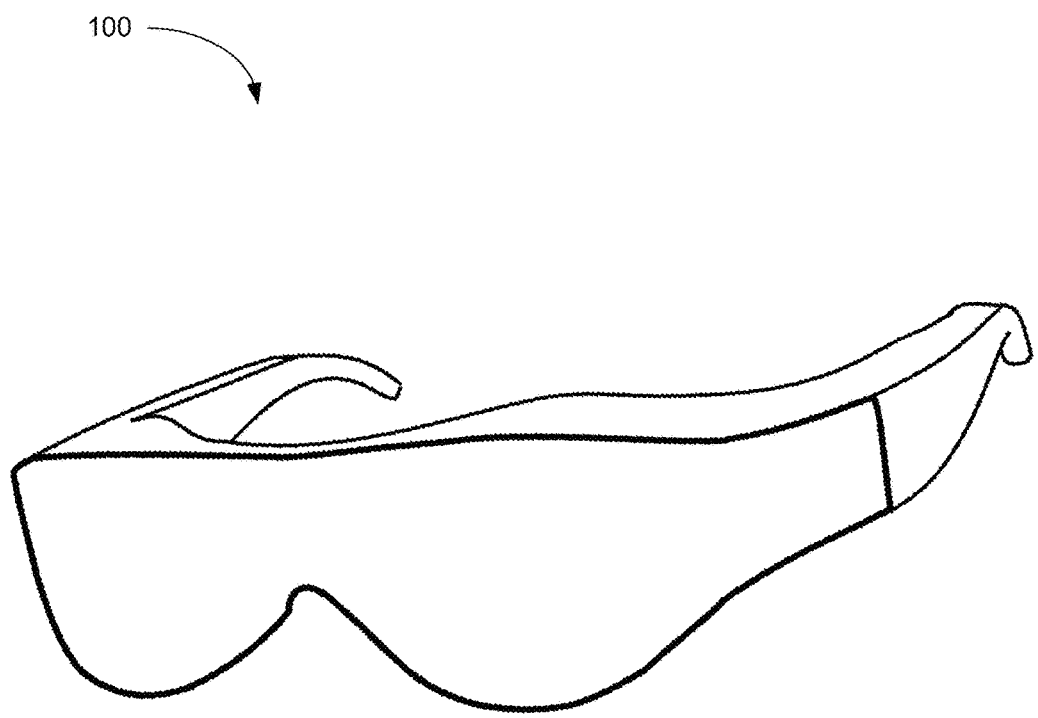
FIG. 1 is a perspective view of a display device in accordance with some embodiments.

These figures are not drawn to scale unless indicated otherwise.

DETAILED DESCRIPTION

Head-mounted display devices and systems include one or more optical sensors for detection and tracking of user's movements. Quality and accuracy of the detection depend on optical lens assemblies included in or coupled with the optical sensors. For example, alignment of the lens assemblies plays a critical role in stable optical measurements. Environmental factors, such as temperature fluctuations and/or mechanical shocks and vibrations, can change the alignment and lead to inaccurate information. Thus, there is a need for lens assemblies with good mechanical performance and stability.

There are advantages in providing lens assemblies of two or more lenses immersed in a filler. A filler, such as an adhesive, can reduce the effect of mechanical shocks by providing a better mechanical contact and support to lenses of the lens assembly. A filler with thermal expansion properties similar to those of the lenses is used to maintain the bonding between the filler and the lenses over a wide range of temperature. A filler with thermal expansion properties similar to those of the enclosure is used to reduce the effect of thermal expansion on an optical path, compared to a lens assembly with an air gap between the lenses. Reduction of the effect of thermal expansion is especially significant for wide-angle optical sensors that require a long lens assembly. Such wide-angle optical sensors are beneficial for detecting and tracking user's movements in head-mounted display device systems.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first lens could be termed a second lens, and, similarly, a second lens could be termed a first lens, without departing from the scope of the various described embodiments. The first lens and the second lens are both lenses, but they are not the same lenses.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user).

In some embodiments, display device 100 includes one or more components described below with respect to FIG. 2. In some embodiments, display device 100 includes additional components not shown in FIG. 2.

Figure 2:
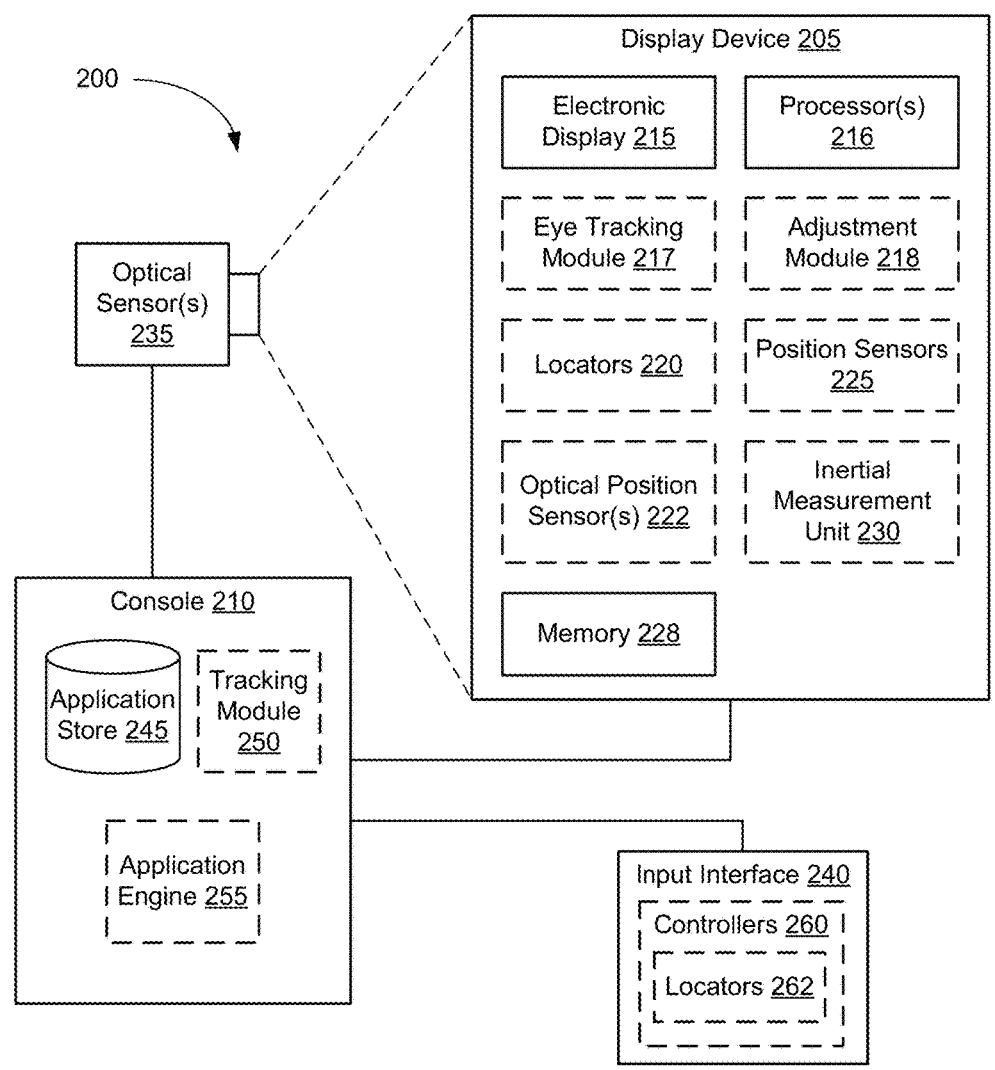
FIG. 2 is a block diagram of a system including a display device in accordance with some embodiments.

FIG. 2 is a block diagram of system 200 in accordance with some embodiments. The system 200 shown in FIG. 2 includes display device 205 (which corresponds to display device 100 shown in FIG. 1), one or more optical sensors 235, and input interface 240 that are each coupled to console 210. While FIG. 2 shows an example of system 200 including one display device 205, one or more optical sensors 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver virtual reality, mixed reality, and augmented reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in a virtual environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operate as a virtual reality (VR) device, an AR device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more optical position sensors 222, memory 228, inertial measurement unit (IMU) 230, or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may include a single adjustable electronic display element or multiple adjustable electronic displays elements (e.g., a display for each eye of a user).

In some embodiments, the display element includes one or more light emission devices and a corresponding array of emission intensity array. An emission intensity array is an array of electro-optic pixels, opto-electronic pixels, some other array of devices that dynamically adjust the amount of light transmitted by each device, or some combination thereof. These pixels are placed behind one or more lenses. In some embodiments, the emission intensity array is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The emission intensity array is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off of the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described above.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 400 nm to 750 nm), in the infrared band (e.g., about 750 nm to 1 mm), in the ultraviolet band (about 100 nm to 400 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

In some embodiments, one or more optical position sensors 222 include one or more still cameras, one or more video cameras, other devices for capturing images, or some combination thereof. In some embodiments, optical position sensors 222 include sensor elements, such as one or more CCD (charge-coupled device) image sensors, one or more CMOS (complementary metal-oxide semiconductor), one or more arrays of CCD and/or CMOS image sensors, or some combination thereof. In some embodiments, optical position sensors 222 include and/or are coupled with optical elements (e.g., lenses and/or lens assemblies) providing a wide-angle field of view. A wide-angle field of view is beneficial for tracking movements of controllers 260 by optical position sensors 222. In some embodiments, optical position sensors 222 generate calibration data that includes one or more images showing observed positions of locators 262 that are detected by optical position sensors 222 (e.g., still cameras, video cameras, CCD or CMOS image sensors).

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

In some embodiments, one or more optical sensors 235 include one or more still cameras, one or more video cameras, any other device capable of capturing images, or some combination thereof. In some embodiments, one or more optical sensors 235 include sensor elements, such as one or more CCD image sensors, one or more CMOS image sensors, one or more arrays of CCD or CMOS image sensors, or some combination thereof. In some embodiments, optical sensors 235 are coupled with one or more optical assemblies. In some embodiments, optical sensors 235 include and/or are coupled with optical elements (e.g., lenses and/or lens assemblies) providing wide-angle field of view. A wide-angle field of view is beneficial for tracking movements of display device 205 and/or controllers 260 by optical sensors 235. Additionally, optical sensors 235 may include one or more filters (e.g., used to increase signal to noise ratio).

In some embodiments, one or more optical sensors 235 generate calibration data in accordance with calibration parameters received from console 210. Calibration data includes one or more images showing observed positions of locators 220 that are detectable by optical sensors 235. Optical sensors 235 are configured to optionally detect light emitted or reflected from locators 220 in a field of view of optical sensors 235. In embodiments where locators 220 include passive elements (e.g., a retroreflector), optical sensors 235 may include a light source that illuminates some or all of locators 220, which retro-reflect the light towards the light source in optical sensors 235. Second calibration data is communicated from optical sensors 235 to console 210, and optical sensors 235 receive one or more calibration parameters from console 210 to adjust one or more imaging parameters (e.g., alignments, focal length, focus, frame rate, ISO, sensor temperature, shutter speed, aperture, etc.).

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

In some embodiments, input interface 240 includes one or more controllers 260. In some embodiments, one or more controllers 260 include one or more of the components described above with respect to display device 205 (e.g., position sensors 225, IMU 230, optical position sensors 222, or one or more locators 262). In some embodiments, controller 260 includes locators 262, which correspond to locators 220 of display device 205, for tracking the movement of controllers 260. In some embodiments, controllers 260 include additional components not shown in FIG. 2.

Console 210 provides media to display device 205 for presentation to the user in accordance with information received from one or more of: one or more optical sensors 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described below may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of one or more optical sensors 235 to obtain a more accurate position for observed locators on display device 205. Moreover, calibration performed by tracking module 250 also accounts for information received from IMU 230. Additionally, if tracking of display device 205 is lost (e.g., one or more optical sensors 235 loses line of sight of at least a threshold number of locators 220), tracking module 250 re-calibrates some or all of system 200.

In some embodiments, tracking module 250 tracks movements of display device 205 using second calibration data from one or more optical sensors 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255. In some embodiments, tracking module 250 tracks movements of controllers 260 using second calibration data from one or more optical sensors 235 and/or optical position sensors 222.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in a virtual environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., digital microscope, etc.). In some embodiments, display device 300 includes light emission device array 310 and lens assembly 330. In some embodiments, lens assembly 330 includes two or more lenses 335. In some embodiments, display device 300 also includes an emission intensity array and an IR detector array.

Light emission device array 310 emits image light and optional IR light toward the viewing user. Light emission device array 310 may be, e.g., an array of LEDs, an array of microLEDs, an array of OLEDs, or some combination thereof. Light emission device array 310 includes light emission devices 320 that emit light in the visible light (and optionally includes devices that emit light in the IR).

The emission intensity array is configured to selectively attenuate light emitted from light emission array 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner the emission intensity array is able to control what portion of the image light emitted from light emission device array 310 is passed to the one or more lens assemblies 330. In some embodiments, display device 300 uses the emission intensity array to facilitate providing image light to a location of pupil 350 of eye 340 of a user, and minimize the amount of image light provided to other areas in the eyebox.

One or more lens assemblies 330 receive the modified image light (e.g., attenuated light) from the emission intensity array (or directly from emission device array 310), and direct the modified image light to a location of pupil 350.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device array 310 and the emission intensity array make up a display element. Alternatively, the display element includes light emission device array 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lens assemblies 330 toward the determined location of pupil 350, and not toward other locations in the eyebox.

Figure 4A:
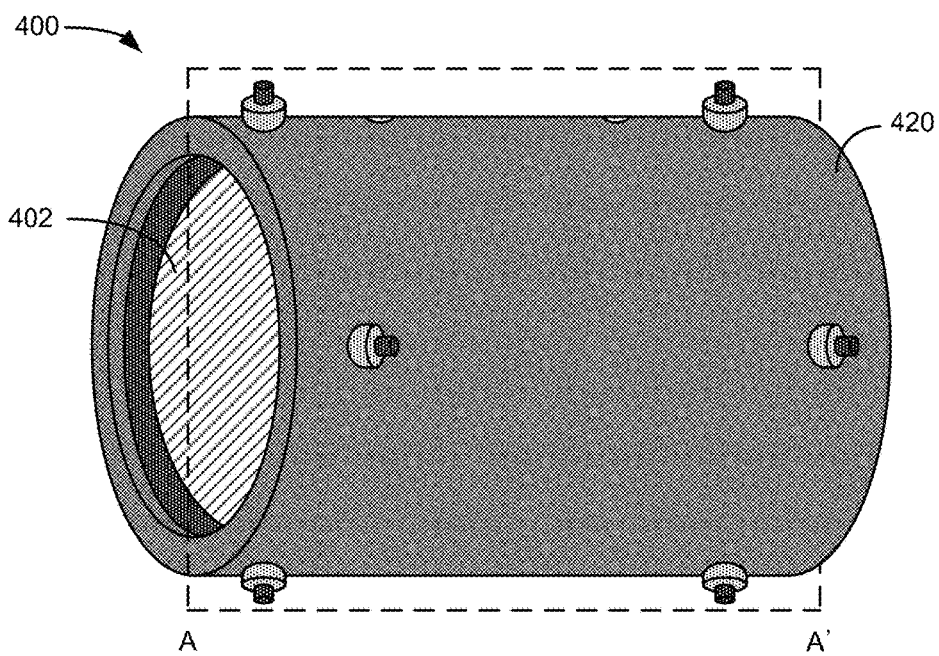
FIG. 4A is an isometric view of a lens assembly in accordance with some embodiments.

FIG. 4A is an isometric view of lens assembly 400 in accordance with some embodiments. Lens assembly 400 includes two or more lenses (e.g., lens 402) within enclosure 420. Surface AA' in FIG. 4A represents a plane upon which the cross-sectional view shown in FIG. 4B is taken.

Figure 4B:
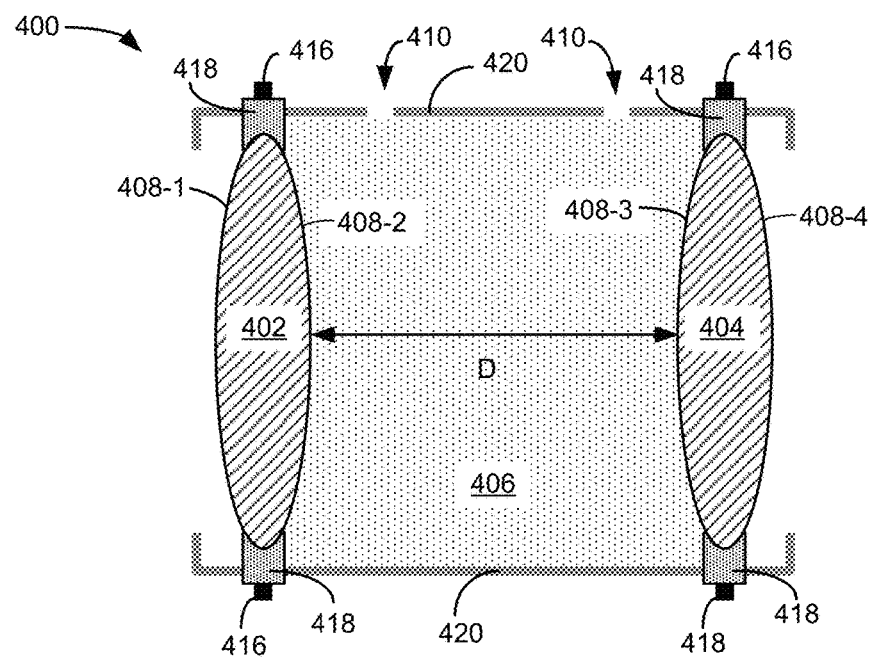
FIG. 4B is a cross-sectional view of a lens assembly in accordance with some embodiments.

FIG. 4B is a cross-sectional view of lens assembly 400 in accordance with some embodiments. In some embodiments, lens assembly 400 corresponds to lens assembly 330 shown in FIG. 3. Lens assembly 400 includes first lens 402, second lens 404, enclosure 420 and filler 406.

First lens 402 has surface 408-1 and surface 408-2, which is opposite to surface 408-1. Second lens 404 has surface 408-3 and surface 408-4, which is opposite to surface 408-3. Surface 408-3 is facing surface 408-2. In FIG. 4B, first lens 402 and second lens 404 are both convex-convex lenses. In some embodiments, a respective lens of lenses 402 and 404 is selected from a group consisting of plano-convex lenses, plano-concave lenses, convex-convex lenses, concave-concave lenses. In some embodiments, a respective lens of lenses 402 and 404 is a spherical lens or an aspheric lens. In some embodiments, first lens 402 has a different shape than second lens 404.

In some embodiments, distance D between first lens 402 and second lens 404 is at least 5 mm (e.g., 5 mm, 10 mm, 15 mm, 20 mm, 25 mm, 30 mm, 35 mm, 40 mm, 45 mm, 50 mm, 60 mm, 70 mm, 80 mm, 90 mm, 100 mm, or more).

First lens 402 and second lens 404 are made of optically transparent substrates. Such substrates include glass (e.g., N-BK7, N-SF11, and F2; barium borate; barium fluoride; magnesium fluoride; sapphire; calcium fluoride; fused silica; calcite; etc.), plastics (e.g., thermoplastic polymers including polycarbonates), polymethylmethacrylate (PMMA), other materials suitable for lens manufacturing and/or any combination of thereof. In some embodiments, the optically transparent substrates include additional compounds such as one or more fillers, colors, hardeners, chemical additives needed for activation of a curing process, etc. In some embodiments, the optically transparent substrates additionally include coatings and/or thin films. In some embodiments, first lens 402 and second lens 404 are made of a same substrate material. In some embodiments, first lens 402 and second lens 404 are made of different substrate materials.

Enclosure 420 forms an outer edge of lens assembly 400 by at least partially enclosing first lens 402 and second lens 404. In some embodiments, enclosure 420 is made of a solid, rigid material (e.g., glass, plastic, metal, etc.) that provides support for lens assembly 400. Enclosure 420 is formed of one, two or more portions (e.g., portions 420-1 and 420-2 which are described below with respect to FIG. 5A). In FIG. 4B, enclosure 420 has openings on the sides (e.g., enclosure 420 has a shape of a tube, and is open on the side facing surface 408-1 and on the side facing surface 408-4). In addition, enclosure 420 has one or more openings 410. In FIG. 4, two openings 410 are shown. In some embodiments, openings 410 are configured to allow filler 406 to enter into enclosure 420.

In FIG. 4B, first lens 402 and second lens 404 are each coupled or attached to enclosure 420 by one or more holders 418 (e.g., one, two, three, four or more holders 418). In some embodiments, a position of holder 418 is adjusted by knob 416 (e.g., adjustment knob). In some embodiments, the position of holder 418 and/or knob 416 is fixed with a lock (e.g., one or more locking screws). In FIG. 4B, each lens is coupled to enclosure 420 by two holders 418. In some embodiments, holders 418 are adjustable holders, which allow movement of the lenses in vertical and/or horizontal directions.

In some embodiments, first lens 402 and/or second lens 404 are attached to enclosure 420 with an adhesive (e.g., an optical adhesive or an optical glue). In some embodiments, an adhesive attachment is used instead of holders 418. In some embodiments, the adhesive attachment is used in addition to holders 418. In some embodiments, first lens 402 is attached to enclosure 420 with an adhesive, whereas second lens 404 is attached with one or more holders 418.

FIG. 4B also illustrates that the space defined by first lens 402, second lens 404, and enclosure 420 is filled with filler 406. In some embodiments, first lens 402 and second lens 404 are immersed or partially immersed in filler 406. In some embodiments, filler 406 includes one or more fillers (e.g., filler 406 is a mixture of two or more filler materials). Filler 406 includes one or more optically transparent materials. In some embodiments, filler 406 has thermal expansion properties compatible with materials used for making lenses 402 and 404. In some embodiments, filler 406 has thermal expansion properties compatible with materials used for making enclosure 420. In some embodiments, filler 406 is an optical adhesive, such as an acrylic-based adhesive, a silicone-based adhesive, an epoxy resin, a urethane adhesive, other adhesive, or any combination thereof. In some embodiments, filler 406 is a curable liquid or gel. In general, filler 406 has good adhesive properties (e.g., bonding or cementing properties) for the materials used for making lenses 402 and 404, as well as enclosure 420. In some embodiments, filler 406 has good adhesive properties bonds with respective surfaces (e.g., respective lens surfaces). Filler 406 is used to affix the positions of the lenses, and hold the lenses firmly in place when exposed mechanical shocks and/or vibrations. Typically, filler 406 has a high optical transmission (e.g., 90% or more) for a wide range of optical spectrum (e.g., 300 nm-800 nm, 400 nm-700 nm, etc.).

In some embodiments, filler 406 is cured. Cured filler 406 provides rigid support to first lens 402 and second lens 404. In some embodiments, filler 406 is not cured. In some embodiments, uncured filler 406 has a high viscosity and is configured to absorb mechanical shocks and/or vibrations.

In some embodiments, lens assembly 400 is configured for providing a wide-angle field of view. In some embodiments, lens assembly 400 includes two or more lenses (e.g., 2, 3, 4, 5, 6 lenses, etc.). In some embodiments, lens assembly 400 additionally includes other optical components, such as one or more filters, one or more apertures, one or more polarizing optics, other optical components, or some combination thereof. In some embodiments, the additional optical components are at least partially immersed in filler 406. In some embodiments, the additional optical components are not (even partially) immersed in filler 406.

Figure 4C:
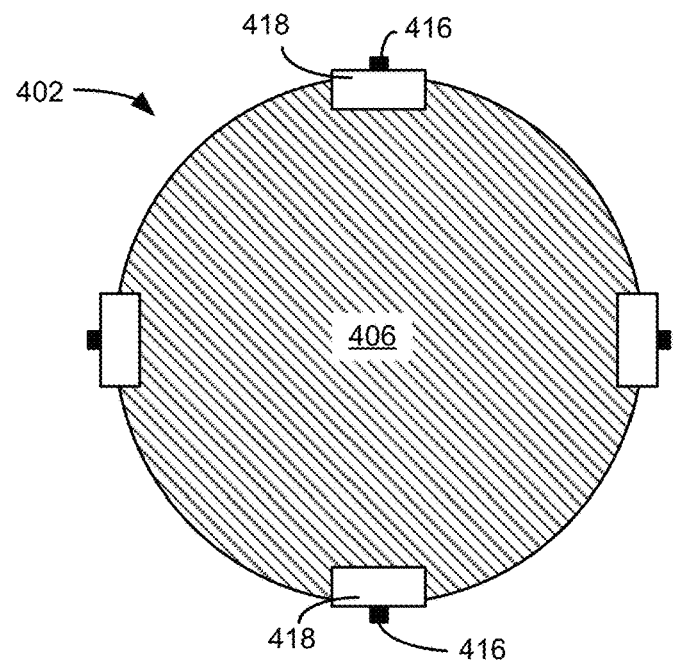
FIG. 4C is an illustration of a lens in contact with a filler in accordance with some embodiments.

FIG. 4C is an illustration of first lens 402 in contact with filler 406 in accordance with some embodiments. The shaded area represents a portion of surface 408-2 of first lens 402 that is in contact with filler 406. In some embodiments, filler 406 does not cover the area of surface 408-2 fully. In particular, filler 406 does not contact the area of surface 408-2 covered by holders 418. As shown in FIG. 4C, filler 406 is in contact with at least 50% of lens surface 408-2 of first lens 402 (e.g., 50%, 60%, 70%, 80%, 90%, 95%, or 99%). Similarly, filler 406 is in contact with at least 50% of lens surface 408-3 of second lens 404 (e.g., 50%, 60%, 70%, 80%, 90%, 95%, or 99%). In FIG. 4C, filler 406 is in contact with a central portion of first lens 402 (e.g., the portion corresponding to the optical axis of first lens 402). In some embodiments, filler 406 contact the area of surface 408-2 fully (e.g., when lens 402 is mounted by adhesives, such as filler 406, without using holder 418).

Although FIG. 4C shows lens 402 held by four holders 418, fewer (e.g., one, two, or three) or more (e.g., five, six, seven, etc.) holders may be used to hold and/or position lens 402. For brevity, such details are omitted herein.

Figure 4D:
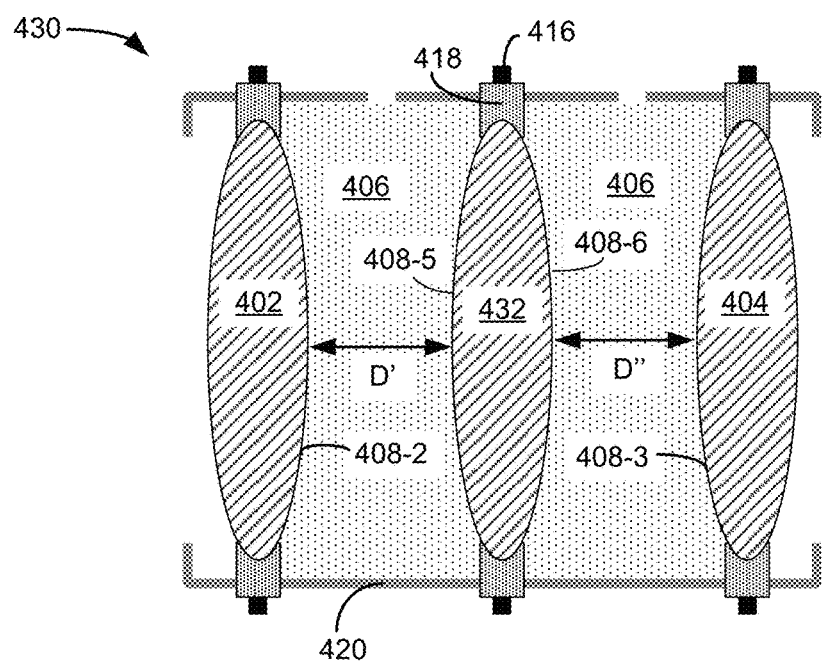
FIG. 4D is a cross-sectional view of a lens assembly in accordance with some embodiments.

FIG. 4D is a cross-sectional view of lens assembly 430 in accordance with some embodiments. Lens assembly 430 is similar to lens assembly 400 shown in FIG. 4B, except that lens assembly 430 has three lenses: first lens 402, second lens 404 and third lens 432. Third lens 432 is located inside enclosure 420, and between first lens 402 and second lens 404. Third lens includes surfaces 408-5 and 408-6, so that surface 408-5 faces surface 408-2 of first lens 402 and surface 408-6 faces surface 408-3 of second lens 404.

In some embodiments, distance D' between first lens 402 and third lens 432 and/or distance D" between third lens 432 and second lens 404 is at least 5 mm (e.g., 5 mm, 10 mm, 15 mm, 20 mm, 25 mm, 30 mm, 35 mm, 40 mm, 45 mm, 50 mm, 60 mm, 70 mm, 80 mm, 90 mm, 100 mm, or more).

In FIG. 4D, third lens 432 is a convex-convex lens. In some embodiments, third lens 432 is a plano-convex lens, a plano-concave lens, a convex-convex lens, or a concave-concave lens. In some embodiments, third lens 432 is a spherical lens or an aspheric lens. Third lens 432 can have the same shape as, or a different shape than, one of first lens 402 and second lens 404. In some embodiments, third lens is manufactured from materials corresponding to first lens 402 and second lens 404, as described above with respect to FIG. 4B. In some embodiments, third lens 432 is coupled or attached to enclosure 420 with one or more holders 418 and/or with an adhesive.

Figure 4E:
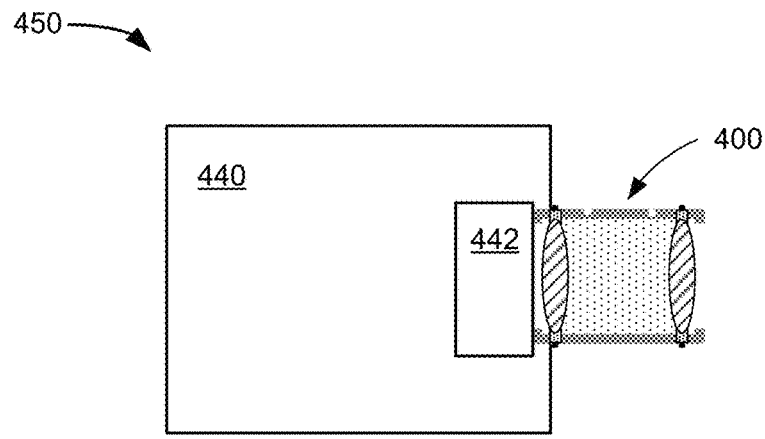
FIG. 4E illustrates an optical imaging device in accordance with some embodiments.

FIG. 4E illustrates optical imaging device 450 in accordance with some embodiments. Optical imaging device 450 includes lens assembly 400 coupled with optical sensor 440. Optical sensor 440 corresponds to one or more optical sensors 235 or one or more optical position sensors 222, as described above with respect to FIG. 2. Optical sensor 440 is coupled to lens assembly 400 so that light transmitted through lens assembly 400 is received by optical sensor 440. Optical sensor 440 is a still camera, a video camera, or other device for capturing images. In some embodiments, optical sensor 440 includes sensor element 442 (e.g., sensor element includes one or more CCD and/or CMOS image sensors).

Lens assembly 400 is coupled with optical sensor 440 by means of coupling lens assemblies to optical devices known in the art. In some embodiments, lens assembly 400 is coupled to optical sensor 440 with a mechanical mount (e.g., a thread mount, a bayonet mount, or a breech-lock mount). In some embodiments, lens assembly 400 is coupled or attached to optical sensor 440 with an adhesive material (e.g., an optical adhesive or glue). In some embodiments, optical imaging device 450 is configured to provide a wide-angle field of view. A wide-angle field of view is beneficial for detection and tracking movements of display device 205 (when lens assembly 400 is used in optical sensor 235) and/or controllers 260 (when lens assembly 400 is used in optical position sensors 222), as described above with respect to FIG. 2.

Figure 4F:
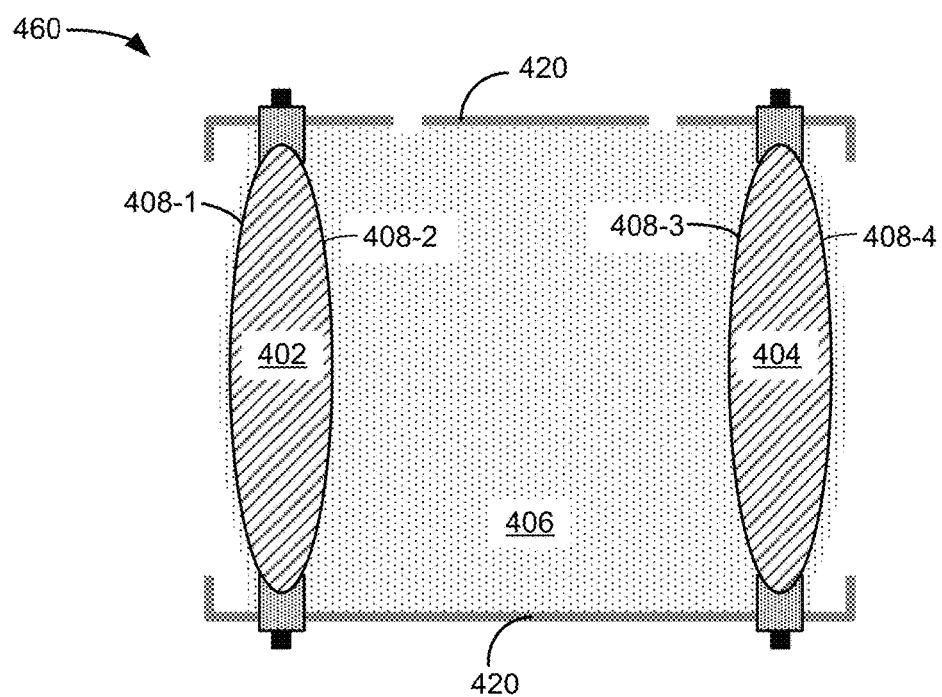
FIG. 4F is a cross-sectional view of a lens assembly in accordance with some embodiments.

FIG. 4F is a cross-sectional view of lens assembly 460 in accordance with some embodiments. Lens assembly 460 is similar to lens assembly 400 shown in FIG. 4B, except that filler 406 is in contact with surface 408-1 and/or surface 408-4. In some cases, filler 406 come into contact with surface 408-1 and/or surface 408-4 when lens assembly 460 is immersed in a batch of filler 406. In some embodiments, lens assembly 460 is subsequently removed from the batch of filler 406 (e.g., for curing filler 406).

FIGS. 5A-5E illustrate a process of making lens assembly 400 in accordance with some embodiments. For a lens assembly with two or more lenses, alignment of lenses (e.g., including adjustment of a distance between the lenses) is important for providing good optical performance.

Figure 5A:
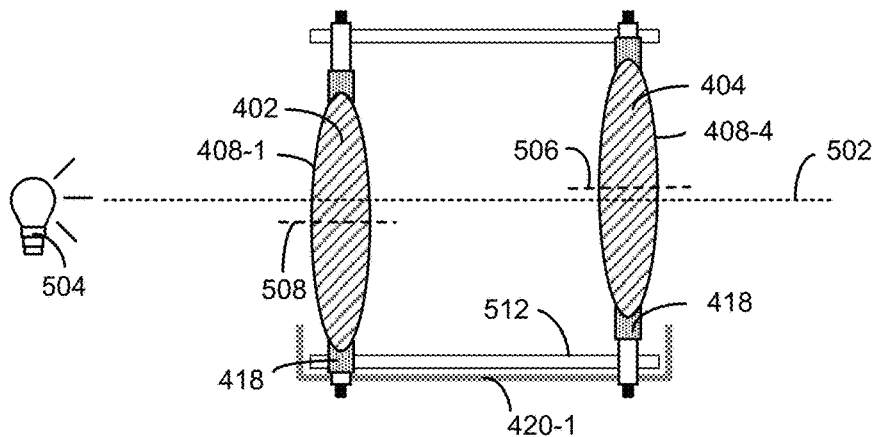
FIGS. 5A-5F illustrate a process of making a lens assembly in accordance with some embodiments.
Figure 5B:
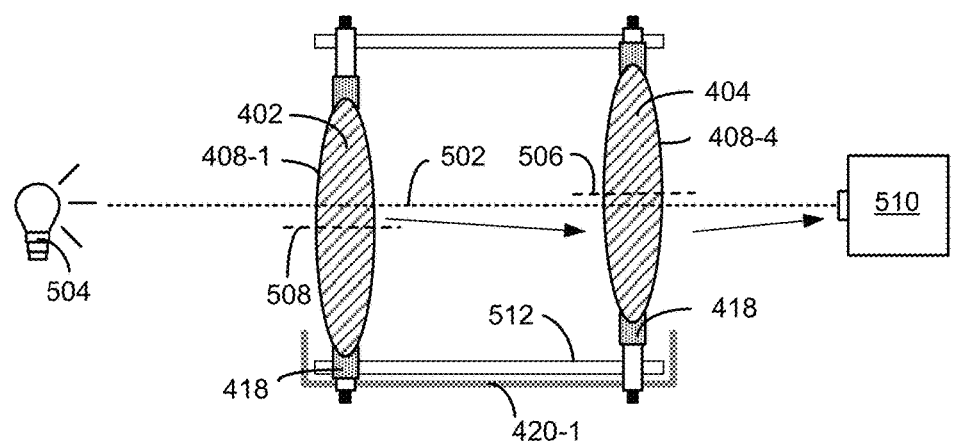
Figure 5C:
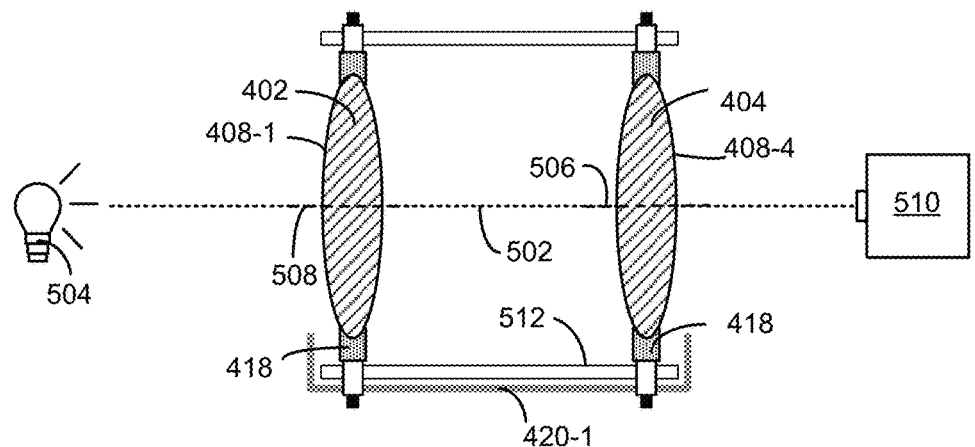

Alignment of lenses 402 and 404 in the process of making lens assembly 400 is demonstrated in FIGS. 5A-5C. In FIG. 5A, first lens 402 and second lens 404 are coupled with first portion 420-1 of enclosure by holders 418. Holders 418 are adjustable and allow movement of first lens 402 and second lens 404 in a vertical direction (e.g., along a plane defined by a respective lens substrate).

In some embodiments, light source 504 (e.g., a laser light source, or a light emitting diode (LED)) is positioned facing surface 408-1. Light source 504 emits reference light 502 transmitted through first lens 402 and second lens 404. Axis 508 illustrates an optical axis of first lens 402 and axis 506 illustrates an optical axis of second lens 404. In FIG. 5A, first lens 402 and second lens 404 are misaligned (e.g., axes 508 and 506 do not coincide with a preselected path of reference light 502 through lenses). As a result, reference light 502 does not follow the preselected path of reference light 502 (e.g., a straight path).

In FIG. 5B, detector 510 (e.g., a beam analyzer or a beam profiler) is positioned facing surface 408-4 so that detector 510 detects reference light 502 emitted by light source 504 and transmitted through first lens 402 and second lens 404. Detector 510 records an intensity and/or a beam profile of reference light 502 while vertical positions of lenses 402 and 404 are adjusted. The intensity and/or beam profile is used as an indicator for alignment of first lens 402 and second lens 404. After the adjustment, first lens 402 and second lens 404 are aligned (e.g., the positions of first lens 402 and second lens 404 are adjusted so that reference light 502 travels through the preselected path), as shown in FIG. 5C. In FIG. 5C, the path of reference light 502 corresponds to optical axes 506 and 508 of both the lenses.

Figure 5D:
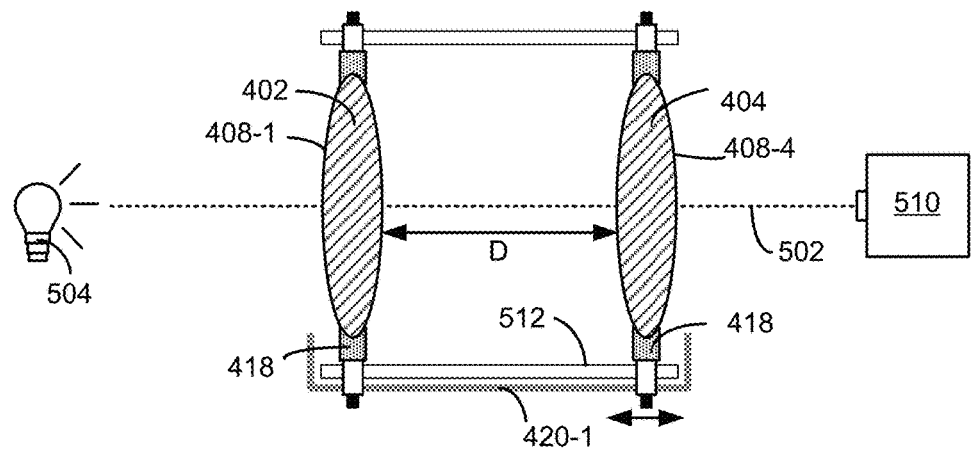

Adjustment of distance D between lenses 402 and 404 is demonstrated in FIG. 5D. In some embodiments, first lens 402 is coupled to first portion 420-1 of enclosure by holder 418, and its position is fixed with a lock (e.g., a locking screw). Second lens 404 is coupled to first portion 420-1 of enclosure with coupling means that allow horizontal movement of second lens 404 along first portion 420-1 of enclosure. In some embodiments, the coupling means include rail 512 shown in FIG. 5D. In some embodiments, the coupling means include a linear stage (e.g., a manual or a motorized linear stage). In some cases, distance D is adjusted by moving second lens 404 along rail 512 horizontally while detecting the intensity and/or the beam profile of reference light 502 by detector 510. After adjustment of distance D (e.g., when distance D matches a predefined distance), the position of second lens 404 is fixed by a lock.

After the alignment, reference light 502 has a first set of propagation properties (e.g., propagation angle, focal plane, etc.) subsequent to passing through first lens 402 and second lens 404. For example, reference light 502, subsequent to passing through first lens 402 and second lens 404, indicates a focal length or a focal plane of lens assembly 400. In some cases, the propagation properties are determined in accordance with the intensity and/or the beam profile of reference light 502 detected by detector 510. The propagation properties change as the optical path of reference light 502 is altered by addition of one or more fillers (e.g., the refractive index of the one or more fillers is different from the refractive index of air). Thus, reference light 502 has a second set of propagation properties subsequent to passing through first lens 402, filler 406, and second lens 404. In some cases, the lens assembly is configured for use with filler 406 included in the lens assembly, and the second set of propagation properties is determined first (e.g., based on an optical simulation of the lens assembly). Subsequently, an optical simulation of the lens assembly, without filler 406, is performed to determine the first set of propagation properties. For example, the focal length of the lens assembly that includes filler 406 is first determined, and subsequently the focal length of the lens assembly that does not include filler 406 is determined. The first set of propagation properties is used for aligning lenses 402 and/or 404. The first set of propagation properties and the second set of propagation properties include properties that indicate aberrations in reference light 502.

Figure 5E:
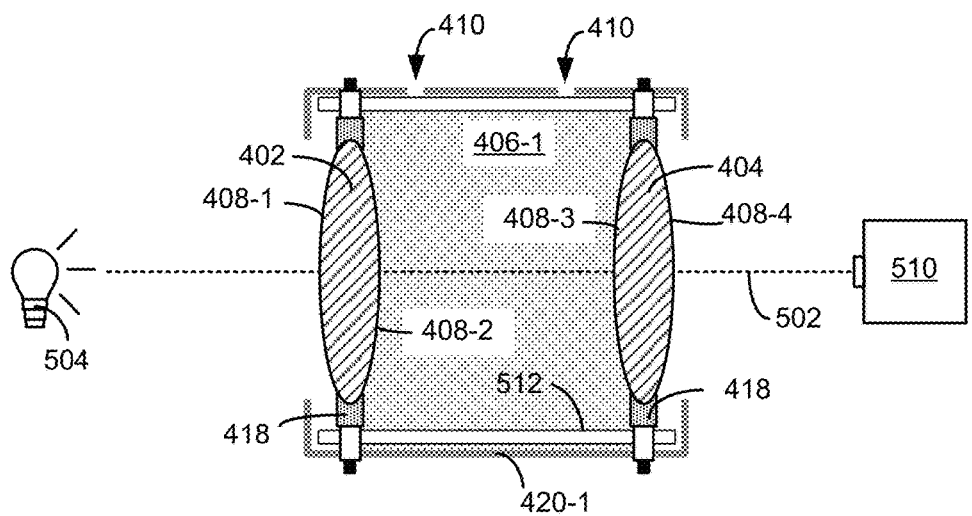

After the alignment and optimization of the focal distance, second portion 420-2 of enclosure is coupled or attached to first portion 420-1 of enclosure so that first portion 420-1 of enclosure and second portion 420-2 of enclosure collectively form enclosure 420 around first lens 402 and second lens 404, as shown in FIG. 5E. In some embodiments, first portion 420-1 of enclosure and second portion 420-2 of enclosure are sealingly coupled (e.g., a filler does not leak through a joining part between first portion 420-1 of enclosure and second portion 420-2 of enclosure). Second portion of enclosure 420-2 includes openings 410 configured to allow addition of filler 406, as described with respect to FIG. 4B. In FIG. 5E, filler 406-1, corresponding to filler 406 as described above with respect to FIG. 4B, is added through openings 410. Filler 406-1 is a curable liquid or a gel filler. Filler 406-1 fills the space defined by first portion 420-1 of enclosure, second portion 420-2 of enclosure, surface 408-2 of first lens 402, and surface 408-3 of second lens 404.

Figure 5F:
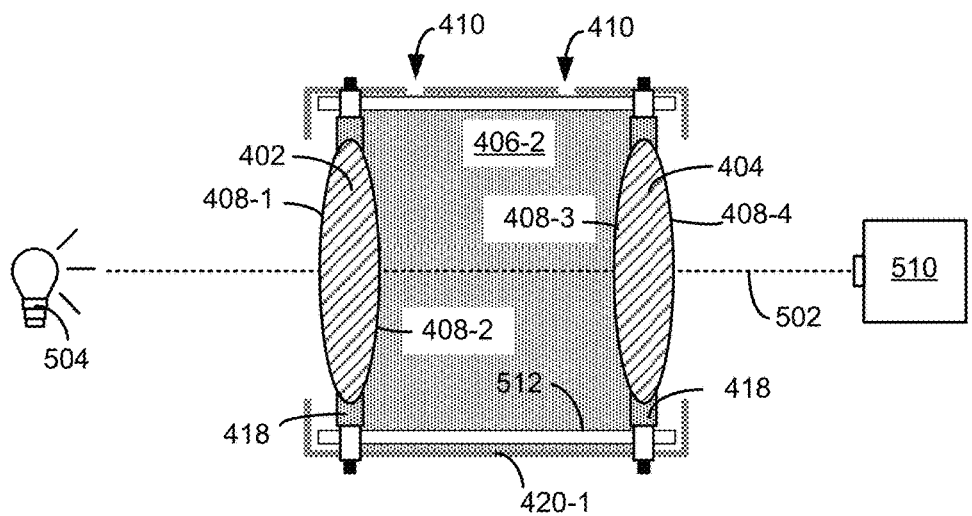

FIG. 5F illustrates that filler 406-1 is cured to form solid filler 406-2 by curing means known in the art. In some embodiments, the curing process is activated by ultraviolet radiation (UV curing), heat, or by a combination of UV and heat. In some embodiments, filler 406-1 includes one or more chemical additives for activation and/or acceleration of the curing process.

In some embodiments, propagation properties of reference light 502 after passing through first lens 402 and second lens 404 are detected by detector 510 during the curing process to determine whether filler 406 has been cured to a preselected extent. For example, the refractive index of filler 406 may change depending on the extent of curing. The curing process is stopped (e.g., a UV light source is turned off or the lens assembly is removed from a UV exposure) when the refractive index of filler 406 matches a preselected refractive index.

In some embodiments, filler 406-2 forms an adhesive contact with respective surfaces. In some embodiments, the adhesive contact provides additional support for lenses in lens assembly 400. For example, filler 406-2 decreases the effect of mechanical shocks and/or vibrations that can cause movement of lenses 402 and 404 and lead to a misalignment. In some embodiments, filler 406-2 also has lower thermal expansion coefficient than enclosure 420. Thus, lens assembly 400 is therefore more tolerant towards fluctuations in temperature compared to a lens assembly with an air gap between the lenses.

Although FIGS. 5A-5F illustrate a process of making lens assembly 400 with two lenses, a similar process can be used for making lens assemblies including three or more lenses. Although FIGS. 5A-5F illustrate a process of making lens assembly, a similar process can be used for making an optical assembly (e.g., an assembly that includes two or more optical elements, which can be lenses, filters, prims, etc.). For brevity, such details are omitted herein.

In light of these principles, we now turn to certain embodiments of a lens assembly.

In accordance with some embodiments, a method of making an optical assembly (e.g., a lens assembly) includes obtaining a first optical element (e.g., a first lens) having a first optical surface (e.g., a first lens surface) and a second optical surface (e.g., a second lens surface) that is opposite to the first optical surface, and a second optical element (e.g., a second lens) having a third optical surface (e.g., a third lens surface) and a fourth optical surface (e.g., a fourth lens surface) that is opposite to the third optical surface. The second optical element is distinct and separate from the first optical element. For example, in FIG. 5A, first lens 402 has surfaces 408-1 and 408-2, and second lens 404 has surfaces 408-3 and 408-4.

The method also includes obtaining an enclosure configured to enclose the first optical element and the second optical element (e.g., enclosure 420 encloses first lens 402 and second lens 404 in FIG. 4B).

The method further includes providing one or more fillers in the enclosure so that the one or more fillers are in contact with the second optical surface and the third optical surface, thereby making the optical assembly (e.g., filler 406-1 is in contact with surface 408-2 and surface 408-3 in FIG. 5E).

In some embodiments, the method further includes, subsequent to providing the one or more fillers in the enclosure, curing the one or more fillers. For example, FIGS. 5E and 5F illustrate curing of filler 406-1 to obtain a solid filler 406-2. In some embodiments, the curing is activated by UV radiation, heat, or by a combination of UV and heat. In some embodiments, filler 406-1 includes one or more chemical additives for activation of curing process.

In some embodiments, the method also includes, prior to providing the one or more fillers in the enclosure, aligning the optical assembly. For example, a process of aligning first lens 402 and second lens 404 of lens assembly 400 is shown in FIGS. 5A-5C. In some embodiments, the alignment is performed by transmitting reference light 502 from light source 504 through first lens 402 and second lens 404 to detector 510 (e.g., a beam analyzer or a beam profiler). Detector 510 detects the intensity and/or the beam profile of reference light 502 while positions of lenses 402 and 404 are adjusted. Alignment is completed when lenses 402 and 404 are positioned to provide the preselected intensity and/or the beam profile of reference light 502. FIG. 5C illustrates lenses 402 and 404 in alignment.

In some embodiments, aligning the optical assembly includes transmitting a reference light through the first optical element and the second optical element without transmitting the reference light through the one or more fillers between the first optical element and the second optical element. For example, in FIGS. 5B and 5C, the alignment is performed prior to addition of filler 406 and therefore reference light 502 emitted by light source 504 is transmitted through first lens 402 and second lens 404 without passing through filler 406. Aligning the optical assembly also includes adjusting a position of the first optical element and/or a position of the second optical element so that the transmitted reference light has a first set of propagation properties subsequent to passing through the first optical element and the second optical element (e.g. in FIG. 5C, reference light 502 has a first set of propagation properties, indicating that the lens assembly has a first focal length). A reference light transmitted through the first optical element, the second optical element, and the one or more fillers has a second set of propagation properties, that is distinct from the first set of propagation properties, subsequent to passing through the first optical element, the second optical element, and the one or more fillers (e.g., in FIG. 5F, reference light 502 has a second set of propagation properties subsequent to passing through first lens 402, second lens 404 and filler 406-2, indicating that the lens assembly has a second focal length that is distinct from the first focal length).

In some embodiments, the first set of propagation properties is determined prior to transmitting the reference light through the first optical element and the second optical element without transmitting the reference light through the one or more fillers. For example, in FIG. 5C, the first set of propagation properties is determined from an optical design of the lens assembly (e.g., the lens assembly including the one or more fillers is designed first and the one or more fillers are removed from the optical model to determine the first set of propagation properties).

In some embodiments, the one or more fillers are optical adhesives. In some embodiments, the one or more fillers include one or more of acrylic-based adhesives, silicone-based adhesives, epoxy resins, urethane adhesives, other adhesives, or any combination thereof. In some embodiments, the one or more fillers include optical adhesives.

In some embodiments, the one or more fillers are in contact with at least 50% of the second optical surface (e.g., filler 406 is in contact with at least 50% of surface 408-2 as shown in FIG. 4C), and the one or more fillers are in contact with at least 50% of the third optical surface (e.g., filler 406 is in contact with at least 50% of surface 408-3).

In some embodiments, the one or more fillers are in contact with a central portion of the second optical surface (e.g., filler 406 is in contact with a central portion of surface 408-2 in FIG. 4C), and the one or more fillers are in contact with a central portion of the third optical surface (e.g., filler 406 is in contact with a central portion of surface 408-3).

In some embodiments, the one or more fillers extend continuously from the second optical surface to the third optical surface (e.g., filler 406 extends continuously from surface 408-2 to surface 408-3 in FIG. 4B).

In some embodiments, the optical also includes a third optical element having a fifth optical surface and a sixth optical surface that is opposite to the fifth optical surface. The third optical element is located between the first optical element and the second optical element. Providing the one or more fillers causes the one or more fillers to come in contact with the fifth optical surface and the sixth optical surface. For example, lens assembly 430 in FIG. 4D has third lens 432 with surface 408-5 and surface 408-6. Third lens 432 is located between first lens 402 and second lens 404. Filler 406 is in contact with surface 408-5 and surface 408-6.

In some embodiments, the one or more fillers extend continuously from the second optical surface to the fifth optical surface and the one or more fillers extend continuously from the sixth optical surface to the third optical surface. For example, filler 406 extends continuously from surface 408-2 to surface 408-5 and from surface 408-6 to surface 408-3 in FIG. 4D.

In some embodiments, the optical assembly includes a first holder located within the enclosure and configured for maintaining a position of the first optical element, and a second holder located within the enclosure and configured for maintaining a position of the second optical element (e.g., holders 418 are located within enclosure 420 and maintain the position of first lens 402 and second lens 404 in FIG. 4B). In some embodiments, the optical assembly includes a first holder located at least partially within the enclosure and configured for maintaining a position of the first optical element, and a second holder located at least partially within the enclosure and configured for maintaining a position of the second optical element.

In some embodiments, one or more openings are defined in the enclosure, the one or more openings configured to allowing the one or more fillers to enter into the enclosure (e.g., openings 410 are defined in enclosure 420 and are configured to allow addition of filler 406 to enclosure 420). For example, in some cases, the one or more fillers are injected through the one or more openings into the enclosure.

In accordance with some embodiments, an optical assembly is made by any method described herein (e.g., lens assembly 400 in FIG. 4B or lens assembly 430 in FIG. 4C is made by the method described in FIGS. 5A-5F).

In accordance with some embodiments, an optical imaging device includes the optical assembly, as described herein (e.g., lens assembly 400 shown in FIG. 4B), and one or more optical sensors coupled with the optical assembly so that light transmitted through the optical assembly is received by the one or more optical sensors. For example, optical imaging device 450 shown in FIG. 4E includes lens assembly 400 and optical sensor 440 coupled with lens assembly 400 so that light transmitted through the lens assembly is received by optical sensor 440. In some embodiments, optical sensor includes a still camera and/or a video camera. In some embodiments, optical sensor 440 includes sensor element 442 (e.g., sensor element 442 includes one or more CCD and/or CMOS image sensors).

In some embodiments, the optical imaging device is configured for tracking a head-mounted display (e.g., the optical imaging device is optical sensor 235 shown in FIG. 2, which is configured for tracking display device 205).

In some embodiments, the optical imaging device is included in a head-mounted display (e.g., the optical imaging device is optical position sensor 222 included in display device 205, as shown in FIG. 2).

In accordance with some embodiments, an optical assembly (e.g., a lens assembly) includes a first optical element having a first optical surface and a second optical surface that is opposite to the first optical surface, and a second optical element having a third optical surface and a fourth optical surface that is opposite to the third optical surface. The second optical element is distinct and separate from the first optical element (e.g., lens assembly 400 in FIG. 4B). The optical assembly also includes one or more fillers located between the first optical element and the second optical element. The one or more fillers are in contact with the second optical surface and the third optical surface (e.g., FIG. 4B).

In some embodiments, the first optical element is separated from the second optical element by at least 5 mm. For example, distance D in FIG. 4B is at least 5 mm. In some embodiments distance D is at least 10 mm, at least 15 mm, at least 20 mm, at least 25 mm, at least 30 mm, at least 35 mm, at least 40 mm, at least 45 mm, at least 50 mm, at least 60 mm, at least 70 mm, at least 80 mm, at least 90 mm, or at least 100 mm.

In some embodiments, the second optical surface (e.g., the second lens surface) is a convex surface and the third optical surface (e.g., the third lens surface) is a convex surface (e.g., surface 408-2 is a convex surface and surface 408-3 is a convex surface). In some embodiments, the second optical surface is a concave surface and the third optical surface is a concave surface.

Although some of various drawings illustrate a number of logical stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A method of making an optical assembly, the method comprising:
   obtaining:
      a first optical element having a first optical surface and a second optical surface that is opposite to the first optical surface;
      a second optical element having a third optical surface and a fourth optical surface that is opposite to the third optical surface, wherein the second optical element is distinct and separate from the first optical element; and an enclosure configured to enclose the first optical element and the second optical element; and providing one or more fillers in the enclosure so that the one or more fillers are in contact with the second optical surface and the third optical surface, thereby making the optical assembly, wherein the optical assembly includes:
  a first holder located within the enclosure and configured for maintaining a position of the first optical element; and
  a second holder located within the enclosure and configured for maintaining a position of the second optical element.

2. The method of claim 1, further comprising:
subsequent to providing the one or more fillers in the enclosure, curing the one or more fillers.

3. The method of claim 1, including:
prior to providing the one or more fillers in the enclosure, aligning the optical assembly.

4. The method of claim 3, wherein aligning the optical assembly includes:
transmitting a reference light through the first optical element and the second optical element without transmitting the reference light through the one or more fillers between the first optical element and the second optical element; and
adjusting a position of the first optical element and/or a position of the second optical element so that the transmitted reference light has a first set of propagation properties subsequent to passing through the first optical element and the second optical element, wherein a reference light transmitted through the first optical element, the second optical element, and the one or more fillers has a second set of propagation properties, that is distinct from the first set of propagation properties, subsequent to passing through the first optical element, the second optical element, and the one or more fillers.

5. The method of claim 4, wherein:
the first set of propagation properties is determined prior to transmitting the reference light through the first optical element and the second optical element without transmitting the reference light through the one or more fillers.

6. The method of claim 1, wherein:
the one or more fillers are optical adhesives.

7. The method of claim 1, wherein:
the one or more fillers are in contact with at least 50% of the second optical surface; and
the one or more fillers are in contact with at least 50% of the third optical surface.

8. The method of claim 1, wherein:
the one or more fillers are in contact with a central portion of the second optical surface; and
the one or more fillers are in contact with a central portion of the third optical surface.

9. The method of claim 1, wherein:
the one or more fillers extend continuously from the second optical surface to the third optical surface.

10. The method of claim 1, wherein:
the optical assembly also includes a third optical element having a fifth optical surface and a sixth optical surface that is opposite to the fifth optical surface;
the third optical element is located between the first optical element and the second optical element; and
providing the one or more fillers causes the one or more fillers to come in contact with the fifth optical surface and the sixth optical surface.

11. The method of claim 10, wherein:
the one or more fillers extend continuously from the second optical surface to the fifth optical surface; and
the one or more fillers extend continuously from the sixth optical surface to the third optical surface.

12. The method of claim 1, wherein one or more openings are defined in the enclosure, the one or more openings configured to allow the one or more fillers to enter into the enclosure.

13. An optical assembly made by the method of claim 1.

14. An optical assembly, comprising:
a first optical element having a first optical surface and a second optical surface that is opposite to the first optical surface;
a second optical element having a third optical surface and a fourth optical surface that is opposite to the third optical surface, wherein the second optical element is distinct and separate from the first optical element;
an enclosure configured to enclose the first optical element and the second optical element;
a first holder located within the enclosure and configured for maintaining a position of the first optical element;
a second holder located within the enclosure and configured for maintaining a position of the second optical element; and
one or more fillers located between the first optical element and the second optical element, wherein the one or more fillers are in contact with the second optical surface and the third optical surface.

15. The optical assembly of claim 14, wherein:
the first optical element is separated from the second optical element by at least 5 mm.

16. The optical assembly of claim 14, wherein:
the second optical surface is a convex surface and the third optical surface is a convex surface; or
the second optical surface is a concave surface and the third optical surface is a concave surface.

17. An optical imaging device, comprising:
the optical assembly of claim 14; and
one or more optical sensors coupled with the optical assembly so that light transmitted through the optical assembly is received by the one or more optical sensors.

18. The optical imaging device of claim 17, wherein the optical imaging device is configured for tracking a head-mounted display.

19. The optical imaging device of claim 17, wherein the optical imaging device is included in a head-mounted display.

* * * * *